United States Patent
Maquet et al.

(10) Patent No.: US 9,616,367 B2
(45) Date of Patent: *Apr. 11, 2017

(54) FILTER CLOTH RETENTION

(71) Applicant: Madison Filter 981 Ltd., Lancashire (GB)

(72) Inventors: Anthony Maquet, Victoria (AU); Richard Patrick Lydon, Chester (GB)

(73) Assignee: MADISON FILTER 981 LTD., Haslingden, Lancashire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,725

(22) Filed: Jan. 18, 2016

(65) Prior Publication Data

US 2016/0129379 A1    May 12, 2016

Related U.S. Application Data

(63) Continuation of application No. 10/595,947, filed as application No. PCT/GB2004/004987 on Nov. 25, 2004, now Pat. No. 9,248,389.

(30) Foreign Application Priority Data

Nov. 27, 2003 (GB) .................................. 0327582.3

(51) Int. Cl.
| | | |
|---|---|---|
| *B01D 35/30* | (2006.01) | |
| *B01D 25/176* | (2006.01) | |
| *B01D 33/23* | (2006.01) | |
| *B01D 33/067* | (2006.01) | |

(52) U.S. Cl.
CPC .......... *B01D 35/30* (2013.01); *B01D 25/176* (2013.01); *B01D 33/067* (2013.01); *B01D 33/23* (2013.01)

(58) Field of Classification Search
CPC .... B01D 25/002; B01D 25/04; B01D 25/176; B01D 25/14; B01D 35/30; B01D 33/23; B01D 33/067; B01D 2201/24; B07B 1/46
See application file for complete search history.

(56) References Cited

U.S. PATENT DOCUMENTS

| | | | |
|---|---|---|---|
| 2,018,398 | A | 10/1935 | Denhard |
| 2,104,473 | A | 1/1938 | Watson |
| 2,204,928 | A | 6/1940 | Culver |
| 2,534,161 | A | 12/1950 | Collins |
| 2,567,266 | A | 9/1951 | Young |
| 3,036,354 | A | 5/1962 | De Bie |
| 3,300,052 | A | 1/1967 | Steintveit |
| 4,330,405 | A | 5/1982 | Davis et al. |

(Continued)

FOREIGN PATENT DOCUMENTS

| | | |
|---|---|---|
| DE | 1008257 | 5/1957 |
| EP | 0636397 A1 | 2/1995 |

(Continued)

OTHER PUBLICATIONS

Definition of "Adhere", Merriam-Webster Online Dictionary (Accessed Aug. 29, 2014, pp. 1-3).

*Primary Examiner* — David C Mellon

(74) *Attorney, Agent, or Firm* — Barlow, Josephs & Holmes, Ltd.

(57) ABSTRACT

Cloth retention apparatus for retaining the edges of a filter cloth comprises an edge strip having which can engage with a channel in a frame member, and be retained therein by a wedging member. The wedging member may be separate or attached to the bead, or incorporated therein.

14 Claims, 3 Drawing Sheets

(56) References Cited

U.S. PATENT DOCUMENTS

| | | |
|---|---|---|
| 4,497,709 A | 2/1985 | Nicholson |
| 4,508,623 A | 4/1985 | Heckl et al. |
| 4,666,596 A | 5/1987 | Oelbermann et al. |
| 4,684,466 A | 8/1987 | Terpstra |
| 5,051,179 A | 9/1991 | Hermann |
| 5,360,541 A | 11/1994 | Gerakios |
| 5,377,846 A | 1/1995 | Askew |
| 5,484,526 A | 1/1996 | Bonn |
| 5,599,446 A | 2/1997 | Junker et al. |
| 5,603,827 A | 2/1997 | Hermann et al. |
| 6,116,431 A | 9/2000 | Barloy |
| 2006/0131224 A1 | 6/2006 | Hibble |

FOREIGN PATENT DOCUMENTS

| | | |
|---|---|---|
| EP | 1691911 A1 | 8/2006 |
| FR | 1478638 | 4/1967 |
| GB | 1075736 | 7/1967 |
| WO | 9400218 A1 | 1/1994 |
| WO | 2004000435 A1 | 12/2003 |
| WO | 2004030790 A1 | 4/2004 |
| WO | 2005053815 A1 | 6/2005 |

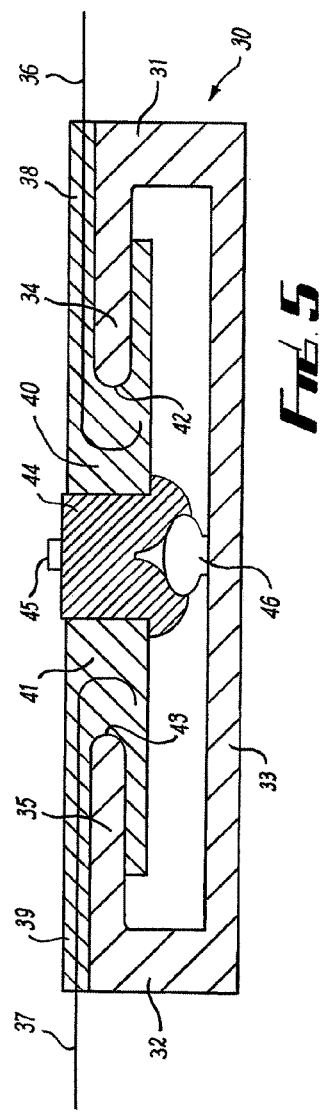
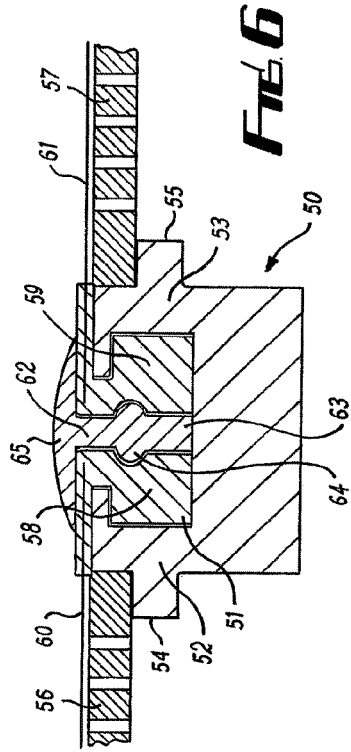

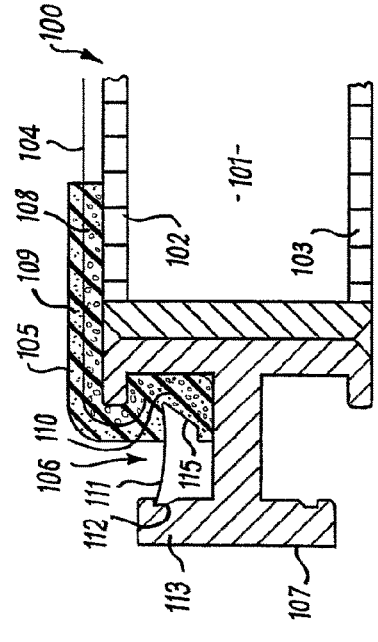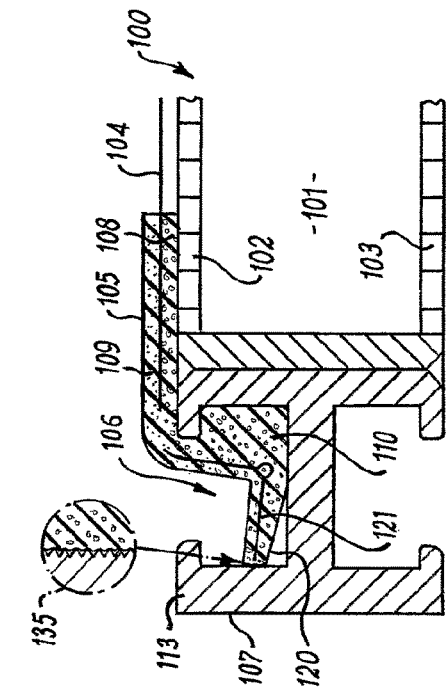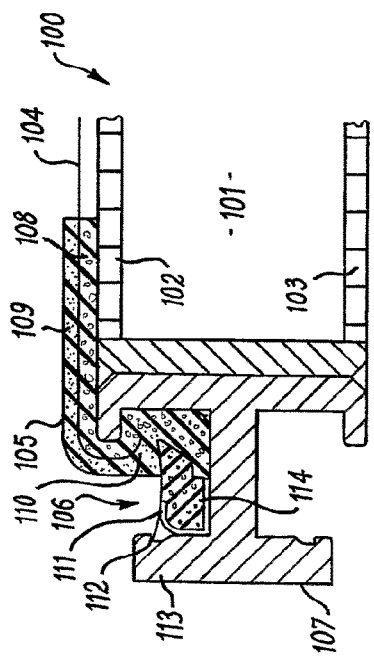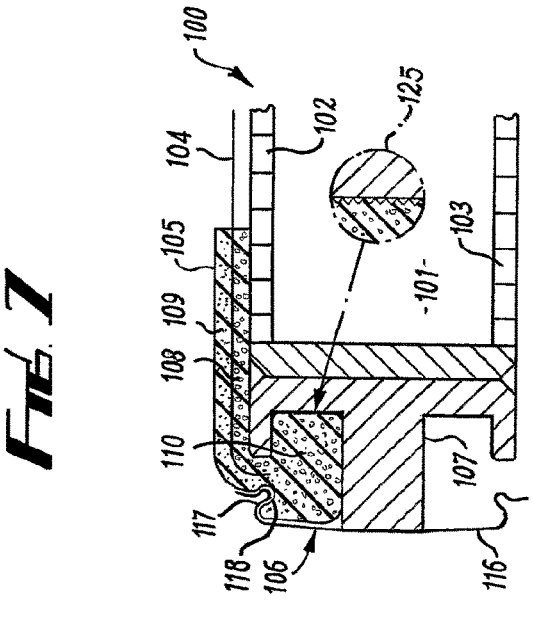

FILTER CLOTH RETENTION

This invention relates to improvements in filter cloth retention, particularly for segments of rotary disc filters, and drum filters.

It is known to receive the edge of a filter cloth between flaps formed by separating layers of an edge strip—e.g. by cutting or delamination, and the cloth then secured between the flaps by stitching, adhesive or thermal welding depending on the material used. It is also known to form a bead of resilient material on the edge of the edge strip, for example integrally therewith, and receiving the bead in the channel sectioned strip forming part of the frame of the filter, the channel section advantageously having an opening or slot of smaller size than the diameter of the bead so that the latter is prevented from being pulled out of the channel section by tension exerted on the filter cloth.

The prior art does not lend itself to easy assembly or disassembly of the edge strip and the channel section member, and changing worn filter cloths can be time-consuming and laborious, presenting significant risk of physical injury when pulling the beading out of the slot.

It is an object of the invention to provide a filter cloth retaining arrangement which can simplify the operation of insertion and removal of the edge structure of the filter cloth whilst maintaining firm retention of the filter fabric.

According to the invention apparatus for retaining a filter cloth comprises an edge strip member for connection to a filter cloth edge region, the edge strip member having an elongate body extending therealong, said body having means for engaging a complementary part of a frame member, and pressure exerting means for pressing said body into engagement with said complementary part.

The edge strip member may receive the edge of the filter cloth between two flaps and be secured between the flaps by stitching, welding or adhesive, or these may be extruded onto the edge strip. The elongate body is preferably formed integrally with the flaps, and may be a generally rectangular cross-sectioned bead having a groove formed towards the filter cloth side which is shaped and dimensioned to fit with a projection directed away from the filter cloth, and formed on the frame member and comprising said complementary part.

The pressure exerting means may be separate from or formed with or connected to the elongate body. It may act as a wedging member inserted with the elongate body within a channel formed in the frame member to push the body into engagement under pressure with one or both opposite sides of the channel.

Alternatively, the pressure exerting means may be mounted, perhaps removably, to provide a channel wall opposite to the complementary part. For example in this case the pressure exerting means may comprise a resilient strip connected by a rib or series of press studs to the frame member.

A further form of pressure exertion means may comprise a tapering wedge sectioned strip which can be inserted in a tapered slot in the elongate body, the wedge sectioned strip being expansible or of larger dimensions than the slot so that the elongate body is forced against the opposite side walls of a channel in the frame member. The strip and the slot may be formed to provide a "keyhole" cross section, that is present a head separated from the main tapered body of the strip by a constriction.

In a yet further form of apparatus for retaining a filter cloth, the elongate body may be formed as a bead having an elliptical cross-section, which can be rotated between a first position where the minor axis is presented to enter into the orifice of a channel in the frame member, and a second position wherein the major axis is presented to the orifice, causing the bead to engage with abutment surfaces to resist drawing out from the orifice. The pressure exerting means comprises a flat rigid core member of metal or rigid plastics for example, within the body of the bead and extending there along, and lying on the major axis of the bead.

In a further version a frame member, between two adjacent filter screens, may comprise a wide channel in which is received edge strips provided on the edges of two oppositely directed filter cloths, each with a respective elongated body therealong, which are received in the channel back-to-back, each with a groove which is hooked over an inwardly directed lip of the channel, and secured in place by a common resilient wedging strip between them. This common wedging strip which provides pressure exerting means pressing the elongated bodies into engagement with their respective channel lips, may have a groove on its inner (or lower) side which engages with a rib or series of ball like studs on the floor of the channel to spread the wedging strip outwards to exert pressure on the elongated bodies. The wedging strip may be provided with a plurality of spaced tabs or a rib on the exposed face of the strip to enable the wedging strip to be removed for changing of the filter cloths. Alternatively, the wedging strip may have a head strip which overlies the gap between the edge strips.

The elongate body may be formed as a bead on the edge of a rubber edge strip, and be secured in position by a spring member engaging with the bead and a channel formed in a frame member. The spring member can be partially or fully embedded in the bead, or may engage in a groove formed in the bead. The groove may be filled with a packing of a coarse foamed, or closed-cell foam, material.

Preferably, the edge strip comprises a flexible rubber, synthetic rubber or plastics material with rubber-like properties, for example a thermoplastic elastomer. The pressure exerting means may preferably comprise a material which matches the edge strip, although it could also be a rubber or rubber-like material which has a different hardness to the edge strip. In this case, the different hardnesses may be because two different materials are used, or because two different grades of the same material are used.

The rubber edge strip may be a composite comprising rubbers of different hardnesses. For example a softer rubber may be used between the filter cloth and the filter apparatus and a harder rubber on the exposed side.

The surface of the beads, or the contacting surface within the channel may be roughened to improved frictional contact, e.g. by micro-grooves, or other roughening.

A number of embodiments of apparatus for retaining filter cloths according to the invention will now be described by way of example with reference to the accompanying drawings, wherein:

FIG. 5 is a sectional view of a modified frame member, for retaining two filter cloths back-to-back and showing apparatus according to the invention adapted to retain two filter cloths;

FIG. 6 is a sectional view of a further embodiment of a modified frame member for retaining two filter cloths back-to-back, including apparatus according to the invention to retain the two filter cloths;

FIGS. 7,8,9 and 10 are respectively sectional views through four further embodiments of frame members each including apparatus according to the invention for retaining a filter cloth.

Figure 1:
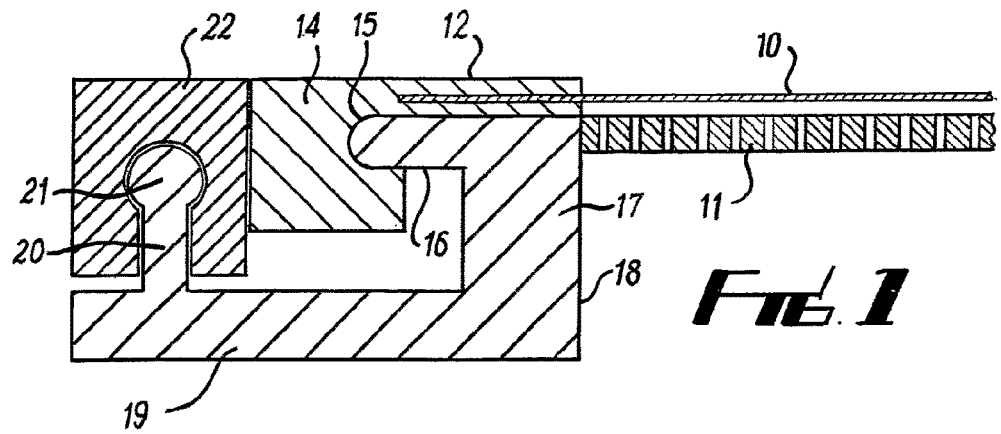
FIG. 1 is a cross sectional view of part of a frame member in a rotary disc or drum filter including a first embodiment of apparatus according to the invention for retaining a filter cloth.

Referring first to FIG. 1, a filter cloth 10 of known constitution is disposed over a perforated screen 11 of for example a sector of a flat rotary disc filter. The edge of the filter cloth 10 is secured in an edge strip 12 of an edge member, in known manner, that is between a pair of flaps and using stitching adhesive or welding, or any combination thereof. The edge member also consists of an elongate body 14 which is integrally formed with the edge strip 12. These features are common to the embodiments of FIGS. 1 to 3 and are given the same reference numerals therein and will not be separately described.

In FIG. 1, elongate body 14 is of generally square cross section and is formed with a groove 15 which is directed towards the direction of the filter cloth 10. This groove 15 is engaged or hooked over a rib 16 formed on a front wall 17 of a frame member 18. This frame member 18 also provides a base web 19, which has a rib 20 formed upstanding thereon, with a wider upper edge 21. Rib 20 carries a pressure exerting member in the form of a stopper or security element 22 of a resilient material with a groove corresponding in shape and dimensions to the rib 20. The stopper or security element 22 is dimensioned so as to firmly urge the elongate body 14 against the rib 16 on the frame member and thereby effect firm retention of the edge member on the frame, and thus of the filter cloth 10.

A filter cloth can be replaced by simply removing the element 22 from the rib 20, which then allows the edge member to be disengaged from the rib 16.

Figure 2:
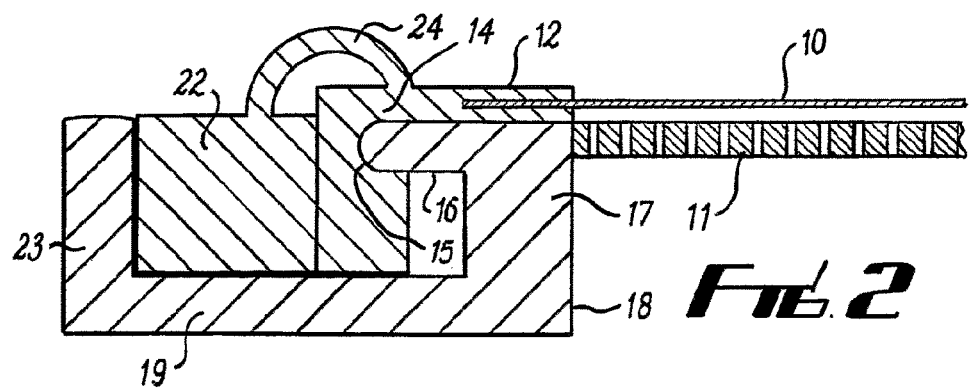
FIG. 2 is a view similar to FIG. 1 showing a second embodiment of apparatus according to the invention for retaining a filter cloth.

In FIG. 2, the frame member 18 is formed as a channel section member having a rear wall 23. The security element 22 is formed integrally with the elongate body 14 of the edge member, and connected thereto by a flexible web 24. The element 22 may be inserted between the body 14 and the rear wall 23 thereby forcing the body 14 into engagement with the rib 16, and thus preventing accidental displacement of the edge member and thus securely mounting the filter fabric 10 with respect to the frame 18. The security element 22 may be pulled out using the web 24, to free the body 14 and thus enable the edge member to be removed from the frame 18 and allow changing of the filter cloth 10.

Figure 3:
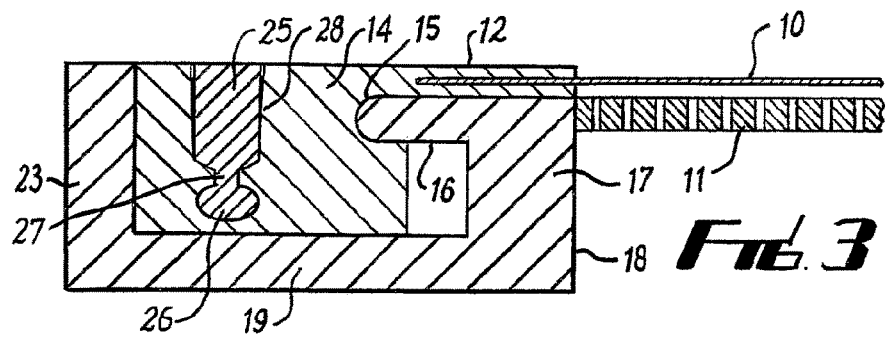
FIG. 3 is a view similar to FIG. 1 showing a third embodiment of apparatus according to the invention for retaining a filter cloth.

FIG. 3 shows a farther embodiment of the invention wherein the frame member 18 is formed as a channel with a rear wall 23. The elongate body 14 is received in the channel with the groove 15 engaging the rib 16, and the body 14 is formed with a key-hole sectioned groove 28 into which a key-hole sectioned wedging member 25 is inserted.

The groove 28 and member 25 widen towards the top, and the key-hole shape is formed by a wider part or bead 26 of the member connected to the main wedge shaped part of the member 25 by a constriction 27. The member 25 is ideally somewhat larger than the groove 28, so that when inserted it exerts outward pressure, forcing the body 14 into contact both with the rear wall 23 and the rib 16. Again, the member 25 can be removed from the groove 28 to thereby enable the body 14 to be removed from the channel of frame member 18 to facilitate changing of filter fabrics 10.

Figure 4:
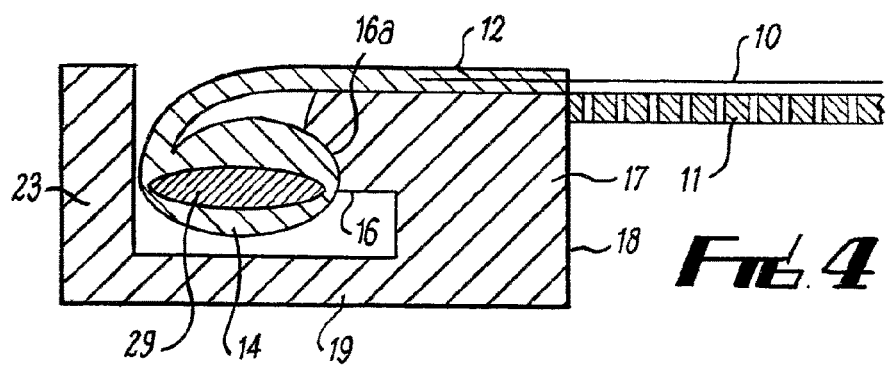
FIG. 4 is a view similar to FIG. 1 showing a fourth embodiment of apparatus according to the invention for retaining a filter cloth.

FIG. 4 shows a somewhat different embodiment wherein the body 14 is an elliptical sectioned bead on the edge strip. When the minor axis of the ellipse is horizontal the body 14 can be easily inserted into and removed from the channel formed in frame member 18. However, on rotation through 90°, the major axis of the body 14 into the position as shown in the drawing is long enough to force the body into engagement between the rear wall 23 of the channel and a concave profiled surface 16a of the rib 16. In this position the body 14 is wedged tight, assisted by a rigid core member 29 which lies on the major axis, and constitutes a presser member.

FIG. 5 illustrates a modified embodiment suitable for receiving two filter cloth edge strips back to back as might happen with a frame member separating two panels of a filter—e.g. a radial frame member in a disc filter, instead of using two frame members such as described in any of the above embodiments in juxtaposition.

In FIG. 5, a frame member 30 has a first side wall 31 and a second side wall 32, separated by a base 33. Each side wall 31, 32 has a respective rib 34, 35 directed towards the mid line of the frame member. A filter fabric 36, 37 is received at each side, being each joined to a respective edge strip 38, 39 by known means. Each edge strip 38, 39 includes a longitudinally extended member 40, 41, with a channel or groove 42, 43 directed outwardly toward the respective fabric, and fitting over the respective rib 34, 35 of the frame member.

The edge strips 38, 39 are secured in the channel, separated and wedged by a security strip 44 of resilient material which has a groove 45 in its lower surface which engages with spaced domes or buttons 46 on the base 33 of the channel, along the centre line thereof—e.g. 200 mm intervals. These help to spread the security strip 44 to improve the wedging or pressure action, and may be replaced if desired by a rib of similar cross section along the centre line of base 33.

Tabs 47 are similarly spaced at 200 min intervals along the top or exposed face of strip 44, and can be used to extract the strip 44 from between the members 40, 41 as a first step to removal and replacement of the filter cloths.

FIG. 6 shows a further embodiment of the invention for retaining two filter cloth edge strips back-to-back. A frame member 50 provides a channel 51 with opposed side walls 52, 53 which provide respective ledges 54, 55 to rest the edges of perforated screens 56, 57, and inwardly turned lips 58,59 about which filter cloth edge strips 60,61 having grooves therein are received. The edge strips each retain the edges of respective filter cloths 62,63.

The space between the edge strips is filled by a push-in locking strip 62, having in cross-section a shank 63 with a wider bead 64 therein which engage in grooves in the edge strips, and a head part 65 to overlie and seal the gap between the edge strips and also permit ease of pushing the locking strip into the space between the edge strips.

FIGS. 7, 8, 9 and 10 are respectively sectional views of four related embodiments of frame members for disc or flat filters incorporating apparatus according to the invention for retaining a filter cloth.

Each of the frame members is adapted to retain two filter cloths, one on each side of a filter disc 100, having an internal cavity 101 from which liquid or gas medium is drawn by evacuation means (not shown) having been drawn into the cavity 101 through upper and lower foraminous walls 102, 103. In each embodiment, the filter cloth 104, and the retaining means therefore are only shown on one side of the disc 100, but it should be understood that the arrangement on the other side is similar and mirror image symmetrical with what is shown.

The edge region of the filter cloth 104 is received within an edge strip 105 of flexible rubber, synthetic rubber, or plastics material having similar properties to rubber, for example thermoplastic elastomers based on polypropylene, polyester, polyamides or similar.

This may be accomplished for example by inserting the edge of the cloth 104 into a slit cut in the edge strip 105, and secured therein by use of adhesives, welding, vulcanisation or stitching for example, or alternatively the edge strip may be formed on the edge of the cloth 104 by moulding, extrusion, casting or the like. The edge strip 105 is received in one side channel 106 of a frame member 107 which is joined to the periphery of the filter discs 100.

The edge strip 105 is of two-part construction, in that the part of the strip between the cloth 104 and the filter disc body 100 is of a relatively soft rubber 108, whereas the part above the cloth 104 is of a relatively hard rubber 109. The soft rubber/hard rubber split extends into the bead part (110) of the edge strip (105). This is very useful because when the bead locates around the rib the softer rubber can deform and shape itself to the rib and wall, thereby effecting a superior water-tight seal with no gaps. The hard rubber remains on the outer face of the bead, and is therefore presented to the slurry during operation. In this way, possible degradation via chemical attack or abrasion from slurry particles is reduced as only the most durable rubber is exposed.

The details of the arrangements are however different in each of FIGS. 7 to 10 and will now be separately described.

Referring first to FIG. 7 the edge strip 105 is formed with a bead 110 for reception in the side channel 106 of the frame member 107. This bead is associated with a resilient steel spring member 111 of generally L-shaped configuration, which engages in a groove in the bead 110, and in a groove 112 in a lip 113 of the channel 106 to force the bead into the channel 106. The groove in the bead 110 is filled with a packing 114 of soft coarse-pored rubber or closed-cell foamed plastics. The spring member 111 is preferably pre-embedded into the bead 110, with the coarse celled foam an integral part of the composite edge strip 105.

The FIG. 8 embodiment, similarly to FIG. 7 again has a bead 110 for insertion into the channel 106, in cooperation with an L-sectional spring member 111. In this case however, the spring engages in a groove 115 in the bead 110 but this is not, unlike FIG. 7, filled with a packing of any kind. Again the spring 111 also engages in a groove 112 in the lip 113 of the channel 106.

In FIG. 9; the channel 106 is not provided with a lip, instead a bead 110 on the strip 105 is made wider and longer than in the preceding embodiments, and is retained by a spring member 116 mounted externally on the frame member 107, and having a rib 117 which engages in a corresponding groove 118 where the bead 110 joins with the main part of the edge strip 105, the spring member 116 completing the channel 106, and positively retaining the bead 110 by means of rib 117.

In FIG. 10, the strip 105 is formed with a rib 120 which gives the strip 105 and bead 110 an overall L-shape, and is adapted to lodge in the channel 106 as shown. The rib 120 and adjacent part of the strip have an L-sectional spring member 121 embedded therein which adds rigidity as well as resilience to the edge region of the strip received on the channel 106. The channel 106 has a lip 113, which engages the rib 120.

It should also be noted that friction between the parts of the edge strip 105 received in the channel 106, and the inner surfaces may be enhanced by micro-scale roughening of either the surface of the rubber strip, for example as shown by enlargement 125 in FIG. 9 wherein the surface of the bead 110 is roughened or micro-grooved, or alternatively the surface of the channel as an enlargement 135 in FIG. 10 where it is the surface of the inner face of lip 113 which is roughened or micro-grooved.

Clearly other embodiments are possible within the scope of the invention, and the invention is not limited to the details of the embodiments shown and described in the foregoing.

The invention claimed is:

1. A filter apparatus comprising:
a frame member having a longitudinal channel with opposing side walls;
opposing perforated filter screens extending perpendicular to said opposing side walls of said longitudinal channel, each of said opposing perforated filter screens having an edge respectively positioned adjacent said opposing side walls of said longitudinal channel, each of said opposing side walls respectively including an outwardly extending ledge to rest said edge of said perforated filter screen thereon;
opposing filter cloths each having an edge respectively positioned adjacent said opposing side walls of said longitudinal channel;
opposing edge strip members each having an elongated body and two outwardly extending flaps, said respective edges of said respective opposing filter cloths being secured between said outwardly extending flaps of said opposing edge strip members by a method selected from the group consisting of stitching, welding, adhering by adhesive and integral extrusion,
said elongated body of each of said opposing edge strip members being received back-to-back in said longitudinal channel with an outer wall thereof disposed in facing relation with said respective opposing side wall of said longitudinal channel and said outwardly extending flaps extending perpendicular to said opposing side walls of said longitudinal channel, whereby each of said opposing filter cloths is respectively positioned in overlying relation over said respective one of said opposing perforated filter screens,
said opposing side walls of said longitudinal channel each including an inwardly turned lip which is received in a respective groove in said outer wall of said elongated body of said edge strip member; and
an elongated resilient wedging member received between facing inner walls of said back-to-back opposing edge strip members,
said elongated resilient wedging member firmly pressing said opposing edge strip members outwardly into locking engagement with said opposing side walls of said longitudinal channel.

2. A filter apparatus according to claim 1, wherein said elongated resilient wedging member includes an outwardly projecting bead which pushes the elongated bodies into engagement under pressure with at least one of said opposing side walls of said longitudinal channel.

3. A filter apparatus according to claim 1, wherein said elongated resilient wedging member is removably mounted.

4. A filter apparatus comprising:
a frame member having a longitudinal channel with opposing side walls and a plurality of longitudinally spaced buttons extending upwardly from a bottom wall of said longitudinal channel;

opposing filter cloths each having an edge respectively positioned adjacent said opposing side walls of said longitudinal channel;

opposing edge strip members each having an elongated body and two outwardly extending flaps, said respective edges of said respective opposing filter cloths being secured between said outwardly extending flaps of said opposing edge strip members by a method selected from the group consisting of stitching, welding, adhering by adhesive and integral extrusion, said elongated body of each of said opposing edge strip members being received back-to-back in said longitudinal channel with an outer wall thereof disposed in facing relation with said respective opposing side wall of said longitudinal channel and said outwardly extending flaps extending perpendicular to said opposing side walls of said longitudinal channel; and an elongated resilient wedging member received between facing inner walls of said back-to-back opposing edge strip members said elongated resilient wedging member acting to firmly press said opposing edge strip members outwardly into locking engagement with said opposing side walls of said longitudinal channel said elongated resilient wedging member having a bottom surface and a groove in said bottom surface to engage said buttons and further urge said opposing edge strip members outwardly into locking engagement with said opposing side walls.

5. A filter apparatus according to claim 4 wherein said opposing side walls of said longitudinal channel each including an inwardly turned lip which is received in a respective groove in an outer wall of said elongated body of said edge strip member.

6. A filter apparatus according to claim 4, wherein said elongated resilient wedging member is removably mounted.

7. A filter apparatus according to claim 5, wherein said elongated resilient wedging member is removably mounted.

8. A filter apparatus comprising:
a frame member having a longitudinal channel with an inner side wall and an opposing retaining structure selected from either an outer side wall or a rib extending upwardly from the bottom wall;

a perforated filter screen extending perpendicular to said inner side walls of said longitudinal channel, a filter cloth having an edge respectively positioned adjacent said inner side walls of said longitudinal channel;

an edge strip member having an elongated body and two outwardly extending flaps, said respective edges of said respective opposing filter cloths being secured between said outwardly extending flaps of said opposing edge strip members by a method selected from the group consisting of stitching, welding, adhering by adhesive and integral extrusion, said elongated body of said edge strip member being received in said longitudinal channel with an inner wall thereof disposed in facing relation with said retaining structure of said longitudinal channel and said outwardly extending flaps extending perpendicular to said retaining structure, whereby said filter cloth is positioned in overlying relation over said perforated filter screen, said inner side wall of said longitudinal channel including an inwardly turned lip which engages with said elongated body portion of said edge strip member; and an elongated resilient wedging member having a shank portion received between said inner wall of said edge strip member and said retaining structure, said shank portion acting to firmly press said edge strip member outwardly into locking engagement with said inner side wall of said longitudinal channel.

9. The filter apparatus of claim 8 wherein said inwardly turned lip is received in a respective groove in said outer wall of said elongated body of said edge strip member.

10. The filter apparatus of claim 8 further comprising an elongated longitudinal rib extending upwardly from a bottom wall of said longitudinal channel and wherein said shank portion of said elongated resilient wedging member includes a groove in its bottom surface to engage said rib and further urge said edge strip member outwardly into locking engagement with inner wall of said longitudinal channel.

11. The filter apparatus of claim 8 wherein said elongated resilient wedging member is tethered to said elongated body of said edge strip member.

12. The filter apparatus of claim 8, wherein said elongated body of said edge strip member includes an elongated upwardly facing groove, said elongated resilient wedging member being received within said upwardly facing groove.

13. The filter apparatus of claim 12, wherein said upwardly facing groove is key-hole sectioned, and said elongated resilient wedging member has a complementary key shape.

14. The filter apparatus of claim 8 wherein said elongated body of said edge strip member is elliptical in shape and said elongated resilient wedge member comprises an elongated core received longitudinally within said elongated body, said inwardly turned lip of said longitudinal channel including a concave profiled surface which receives said elliptical elongated body in interfitting engagement.

* * * * *